United States Patent
Jin et al.

(10) Patent No.: US 12,293,078 B2
(45) Date of Patent: May 6, 2025

(54) STORAGE SPACE ORGANIZATION METHOD AND ELECTRONIC DEVICE

(71) Applicant: Honor Device Co., Ltd., Shenzhen (CN)

(72) Inventors: Dachen Jin, Shenzhen (CN); Jian Dang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/552,295

(22) PCT Filed: Apr. 19, 2023

(86) PCT No.: PCT/CN2023/089219
§ 371 (c)(1),
(2) Date: Sep. 25, 2023

(87) PCT Pub. No.: WO2024/007678
PCT Pub. Date: Jan. 11, 2024

(65) Prior Publication Data
US 2025/0085850 A1 Mar. 13, 2025

(30) Foreign Application Priority Data
Jul. 4, 2022 (CN) .......................... 202210776818.7

(51) Int. Cl.
*G06F 3/06* (2006.01)
(52) U.S. Cl.
CPC .......... *G06F 3/0608* (2013.01); *G06F 3/0638* (2013.01); *G06F 3/0679* (2013.01)
(58) Field of Classification Search
CPC .... G06F 3/0679; G06F 3/0608; G06F 3/0634; G06F 1/3206; G06F 3/0643; G06F 3/0638
(Continued)

(56) References Cited

U.S. PATENT DOCUMENTS

| 11,093,453 B1 | 8/2021 | Reza et al. |
| 11,126,546 B2 | 9/2021 | Yu et al. |

(Continued)

FOREIGN PATENT DOCUMENTS

| CN | 1776568 A | 5/2006 |
| CN | 1822230 A | 8/2006 |

(Continued)

OTHER PUBLICATIONS

Liu Gang et al., "A Modular Design of IO Cache in Dual Control Storage System", Journal of Computer Research and Development, Jan. 4, 2012; 5 pages.

(Continued)

*Primary Examiner* — Hashem Farrokh
(74) *Attorney, Agent, or Firm* — Slater Matsil, LLP

(57) ABSTRACT

This application discloses a storage space organization method and an electronic device. A kernel of the electronic device includes a file system and a block layer, and the method includes: monitoring, by the electronic device, input/output ports IOs through the block layer, and determining, by the block layer when there is IO release, whether all the IOs have been released; and updating, by the electronic device when all the IOs have been released, a state of the file system to an idle state through the block layer, to trigger the electronic device to perform first garbage collection processing through the file system, where the state of the file system includes the idle state and a busy state.

13 Claims, 8 Drawing Sheets

(58) Field of Classification Search
USPC .................................................. 711/154, 170
See application file for complete search history.

(56) References Cited

U.S. PATENT DOCUMENTS

| | | |
|---|---|---|
| 2015/0193338 A1 | 7/2015 | Sundaram et al. |
| 2019/0171389 A1 | 6/2019 | Muthiah et al. |
| 2019/0238312 A1* | 8/2019 | Dickens, III .......... G06F 3/0673 |
| 2021/0278990 A1 | 9/2021 | Choi |
| 2022/0058118 A1 | 2/2022 | Yu et al. |
| 2022/0147257 A1* | 5/2022 | Bhowmik ............. G06F 3/0665 |
| 2023/0325103 A1* | 10/2023 | Ponnuswamy ....... G06F 3/0679 |

FOREIGN PATENT DOCUMENTS

| | | |
|---|---|---|
| CN | 101281458 A | 10/2008 |
| CN | 202120349 U | 1/2012 |
| CN | 105389266 A | 3/2016 |
| CN | 108874683 A | 11/2018 |
| CN | 109240941 A | 1/2019 |
| CN | 109726137 A | 5/2019 |
| CN | 110709810 A | 1/2020 |
| CN | 112559381 A | 3/2021 |
| CN | 113296880 A | 8/2021 |
| CN | 114442932 A | 5/2022 |
| CN | 114840450 A | 8/2022 |
| EP | 3680786 A1 | 7/2020 |
| WO | 2021162388 A1 | 8/2021 |

OTHER PUBLICATIONS

Xiaobin Wu, "The Design and Implementation of small object storage system with multi read and multi write", Dissertation for the Master Degree (with English abstract); Jan. 15, 2022; 97pages.

Juraj Selep, "Implementing garbage collection into the storage of the TezEdge node", Feb. 4, 2021; Retrieved from the internet, URL:https://medium.com/tezedge/implementing-garbage-collection-into-the-storage-of-the-tezedge-node-77f32fb260d9, 24 pages.

* cited by examiner

STORAGE SPACE ORGANIZATION METHOD AND ELECTRONIC DEVICE

CROSS-REFERENCE TO RELATED APPLICATIONS

This application is a National Stage of International Application No. PCT/CN2023/089219 filed on Apr. 19, 2023, which claims priority to Chinese Patent Application No. 202210776818.7 filed on Jul. 4, 2022, which are incorporated herein by references in their entireties.

TECHNICAL FIELD

This application relates to the field of terminal technologies, and in particular, to a storage space organization method and an electronic device.

BACKGROUND

To improve the continuity of the storage space of an electronic device and delay freezing of the electronic device, garbage collection processing needs to be performed on the storage space, and the garbage collection processing often needs to be performed through a file system that manages the storage device. During use of the electronic device, the user is likely to use the file system of the electronic device. However, processing resources, interfaces, and the like of the file system are all limited, and a conflict with the user's use may occur during the garbage collection processing of the file system, which causes the garbage collection and the user to compete for resources, resulting in freezing to the user.

SUMMARY

Embodiments of this application discloses a storage space organization method and an electronic device, which can avoid GC window missing, and ensure the success rate of garbage collection processing, thereby improving the continuity of the storage space, and delaying freezing of the electronic device.

According to a first aspect, this application provides a storage space organization method, where the method is applied to an electronic device, a kernel of the electronic device includes a file system and a block layer, and the method includes: monitoring, by the electronic device, input/output ports IOs through the block layer, and determining, by the block layer when there is IO release, whether all the IOs have been released; and updating, by the electronic device when all the IOs have been released, a state of the file system to an idle state through the block layer, to trigger the electronic device to perform first garbage collection processing through the file system, where the state of the file system includes the idle state and a busy state.

The first garbage collection processing is garbage collection processing performed by the file system based on logical addresses.

In the embodiments of this application, the block layer monitors IO occupancy, and when all the IOs are released, actively changes the state of the file system to the idle state, actively triggers first GC detection, and starts a process of first GC, so that the idle timing of the electronic device can be better grasped, thereby reducing the quantity of times of GC window missing due to the conflict caused by that both the first GC detection and user operations occupy the IO ports of the block layer, and improving the success rate of the GC process of the electronic device. The probability of determining execution of GC processing through GC detection increases, and the quantity of times for which storage devices such as disks of the electronic device are organized increases, thereby delaying freezing of the electronic device and prolonging the service life of the electronic device.

In a possible implementation, the updating, by the electronic device, a state of the file system to an idle state through the block layer, to trigger the electronic device to perform first garbage collection processing through the file system specifically includes: updating, by the electronic device, the state of the file system to the idle state through the block layer, and triggering, by the file system after a first duration, garbage collection detection and determining whether a garbage collection condition is met, where the garbage collection condition is that the state of the file system is the idle state and all the IOs of the block layer have been released; and performing, by the electronic device when the garbage collection condition is met, the first garbage collection processing through the file system. In this way, the electronic device triggers an update instruction of a file state after the first duration, to ensure that there is no task instruction for file processing within a period of time as much as possible, and ensure that GC processing is performed when IO resources of the block layer are idle, thereby avoiding IO conflicts with user operations, and increasing the possibility of successful GC processing while ensuring the user experience.

In a possible implementation, after the triggering, by the file system, garbage collection detection, the method further includes: after a second duration since the file system triggers the garbage collection detection, triggering, by the electronic device through the file system, garbage collection detection again and determining whether the garbage collection condition is met; and performing, by the electronic device when the garbage collection condition is met, the first garbage collection processing again through the file system. In this way, the electronic device can immediately start timing of periodic detection after the garbage collection detection, and when the garbage collection detection is not actively triggered during the second duration (active triggering is a triggering process after the foregoing state of the file system is updated to the idle state), the garbage collection detection can be periodically performed, to ensure the frequency of garbage collection, thereby further improving the continuity of the storage space and delaying freezing of the electronic device.

The second duration is a duration for periodically performing garbage collection detection. For details, reference may be made to the relevant description in FIG. 7.

In a possible implementation, the electronic device further includes a storage device, and after the updating, by the electronic device, the state of the file system to the idle state through the block layer, the method further includes: triggering, by the electronic device through the block layer, the storage device to perform second garbage collection processing. In this way, during the second garbage collection, the process of the second garbage collection may also be triggered, to ensure that physical storage addresses will also be organized, thereby improving the continuity of the storage space.

The second garbage collection processing is garbage collection processing performed by the storage device based on physical addresses.

In a possible implementation, the monitoring, by the electronic device, IOs through the block layer specifically includes: monitoring, by the electronic device through the block layer, whether a task instruction is received, where the task instruction is a notification sent to the block layer when the file system acquires a first task and indicating execution of the first task; determining, by the electronic device when the block layer receives the task instruction, that there is IO occupation through the block layer; monitoring, by the electronic device through the block layer, whether a task end notification is received, where the task end notification is a notification sent to the block layer when the storage device of the electronic device completes execution of the first task; and determining, by the electronic device when the block layer receives the task end notification, that there is IO release through the block layer. In this way, the block layer can monitor the IO situation through the execution of tasks. That is, the block layer may count the IOs through an IO counting module. When a task is received, the occupied IOs are increased by one, and when a task ends, the occupied IOs are decreased by one. Therefore, it can be ensured that when there is a decrease in the occupied IOs, detecting whether the occupied IOs are 0 is triggered, so as to trigger the process of garbage collection. Therefore, accurate triggering can avoid GC window conflicts, so that the success rate of garbage collection processing can be ensured, thereby improving the degree of order of the storage space, and delaying freezing of the electronic device.

The first task may be a task for file processing received from the user space by the file system. When the first task is acquired, the file system delivers a task instruction (which may include one or more task instructions) to the block layer. When the first task ends, the storage device may send a task end notification to the block layer.

In a possible implementation, the electronic device further includes an internal memory and a processor, and when the block layer receives the task instruction, the method further includes: controlling, by the electronic device through the block layer, the internal memory to increase a first operating frequency; and controlling, by the electronic device through the block layer, the processor to increase a second operating frequency. In this way, during use of the user or when the file system is busy, the operating frequencies are increased, the task processing is accelerated, and the processing efficiency is improved, thereby reducing the processing time and improving the user experience.

The first operating frequency is an operating frequency of the internal memory; and the second operating frequency is an operating frequency of the processor. For the process of increasing the operating frequencies, reference may be made to S604 to S607 in FIG. 6A and FIG. 6B.

In a possible implementation, the electronic device further includes an internal memory and a processor, and when the block layer receives the task end notification, and the electronic device is in a preset state, the method further includes: controlling, by the electronic device through the block layer, the internal memory to decrease a first operating frequency; and controlling, by the electronic device through the block layer, the processor to decrease a second operating frequency. In this way, when the electronic device can complete the task processing, and does not need to use processing resources, the operating frequencies of the internal memory and the processor are decreased, and waste of the processing resources and energy is reduced.

The first operating frequency is an operating frequency of the internal memory; and the second operating frequency is an operating frequency of the processor. For the process of decreasing the operating frequencies, reference may be made to S619 to S622 in FIG. 6A and FIG. 6B.

In a possible implementation, the preset state is that the electronic device is in a screen-off state and the state of the file system is updated to the idle state. In this way, when the user turns off the screen and the state of the file system is determined to be updated (all the IOs have been released), the operating frequencies are decreased. Under such conditions, the user is less likely to use the electronic device, and the task processing have been completed. In this case, both the user's use and the energy consumption of the electronic device can be taken into account through frequency decreasing.

In this application, the screen-off state is that the screen of the electronic device is off.

According to a second aspect, this application provides an electronic device, including: one or more processors and one or more memories. A kernel of the electronic device includes a file system and a block layer. The one or more memories are configured to store computer program code, and the computer program code includes computer instructions. When the one or more processors execute the computer instructions, the electronic device is enabled to perform the following steps:

monitoring input/output ports IOs through the block layer, and determining, by the block layer when there is IO release, whether all the IOs have been released; and when all the IOs have been released, updating a state of the file system to an idle state through the block layer, to trigger the electronic device to perform first garbage collection processing through the file system, where the state of the file system includes the idle state and a busy state.

The first garbage collection processing is garbage collection processing performed by the file system based on logical addresses.

In the embodiments of this application, the block layer monitors IO occupancy, and when all the IOs are released, actively changes the state of the file system to the idle state, actively triggers first GC detection, and starts a process of first GC, so that the idle timing of the electronic device can be better grasped, thereby reducing the quantity of times of GC window missing due to the conflict caused by that both the first GC detection and user operations occupy the IO ports of the block layer, and improving the success rate of the GC process of the electronic device. The probability of determining execution of GC processing through GC detection increases, and the quantity of times for which storage devices such as disks of the electronic device are organized increases, thereby delaying freezing of the electronic device and prolonging the service life of the electronic device.

In a possible implementation, the updating, by the electronic device, a state of the file system to an idle state through the block layer, to trigger the electronic device to perform first garbage collection processing through the file system specifically performs: updating the state of the file system to the idle state through the block layer, and triggering, by the file system after a first duration, garbage collection detection and determining whether the garbage collection condition is met, where the garbage collection condition is that the state of the file system is the idle state and all the IOs of the block layer have been released; and when the garbage collection condition is met, performing the first garbage collection processing through the file system. In this way, the electronic device triggers an update instruction of a file state after the first duration, to ensure that there is no task instruction for file processing within a period of time as much as possible, and ensure that GC processing is performed when IO resources of the block layer are idle, thereby avoiding IO conflicts with user operations, and increasing the possibility of successful GC processing while ensuring the user experience.

In a possible implementation, after the triggering, by the file system, garbage collection detection, the electronic device further performs: after a second duration since the file system triggers the garbage collection detection, triggering, through the file system, garbage collection detection again and determining whether the garbage collection condition is met; and when the garbage collection condition is met, performing the first garbage collection processing again through the file system. In this way, the electronic device can immediately start timing of periodic detection after the garbage collection detection, and when the garbage collection detection is not actively triggered during the second duration (active triggering is a triggering process after the foregoing state of the file system is updated to the idle state), the garbage collection detection can be periodically performed, to ensure the frequency of garbage collection, thereby further improving the continuity of the storage space and delaying freezing of the electronic device.

The second duration is a duration for periodically performing garbage collection detection. For details, reference may be made to the relevant description in FIG. 7.

In a possible implementation, the electronic device further includes a storage device, and after the updating, by the electronic device, the state of the file system to the idle state through the block layer, the electronic device further performs: triggering, through the block layer, the storage device to perform second garbage collection processing. In this way, during the second garbage collection, the process of the second garbage collection may also be triggered, to ensure that physical storage addresses will also be organized, thereby improving the continuity of the storage space.

The second garbage collection processing is garbage collection processing performed by the storage device based on physical addresses.

In a possible implementation, the monitoring, by the electronic device, IOs through the block layer specifically performs: monitoring, through the block layer, whether a task instruction is received, where the task instruction is a notification sent to the block layer when the file system acquires a first task and indicating execution of the first task; determining, when the block layer receives the task instruction, that there is IO occupation through the block layer; monitoring, through the block layer, whether a task end notification is received, where the task end notification is a notification sent to the block layer when the storage device of the electronic device completes execution of the first task; and determining, when the block layer receives the task end notification, that there is IO release through the block layer. In this way, the block layer can monitor the IO situation through the execution of tasks. That is, the block layer may count the IOs through an IO counting module. When a task is received, the occupied IOs are increased by one, and when a task ends, the occupied IOs are decreased by one. Therefore, it can be ensured that when there is a decrease in the occupied IOs, detecting whether the occupied IOs are 0 is triggered, so as to trigger the process of garbage collection. Therefore, accurate triggering can avoid GC window conflicts, so that the success rate of garbage collection processing can be ensured, thereby improving the continuity of the storage space, and delaying freezing of the electronic device.

The first task may be a task for file processing received from the user space by the file system. When the first task is acquired, the file system delivers a task instruction (which may include one or more task instructions) to the block layer. When the first task ends, the storage device may send a task end notification to the block layer.

In a possible implementation, the electronic device further includes an internal memory and a processor, and when the block layer receives the task instruction, the electronic device further performs: controlling, through the block layer, the internal memory to increase a first operating frequency; and controlling, through the block layer, the processor to increase a second operating frequency. In this way, during use of the user or when the file system is busy, the operating frequencies are increased, the task processing is accelerated, and the processing efficiency is improved, thereby reducing the processing time and improving the user experience.

The first operating frequency is an operating frequency of the internal memory; and the second operating frequency is an operating frequency of the processor. For the process of increasing the operating frequencies, reference may be made to S604 to S607 in FIG. 6A and FIG. 6B.

In a possible implementation, the electronic device further includes an internal memory and a processor, and when the block layer receives the task end notification, and the electronic device is in a preset state, the electronic device further performs: controlling, through the block layer, the internal memory to decrease a first operating frequency; and controlling, through the block layer, the processor to decrease a second operating frequency. In this way, when the electronic device can complete the task processing, and does not need to use processing resources, the operating frequencies of the internal memory and the processor are decreased, and waste of the processing resources and energy is reduced.

The first operating frequency is an operating frequency of the internal memory; and the second operating frequency is an operating frequency of the processor. For the process of decreasing the operating frequencies, reference may be made to S619 to S622 in FIG. 6A and FIG. 6B.

In a possible implementation, the preset state is that the electronic device is in a screen-off state and the state of the file system is updated to the idle state. In this way, when the user turns off the screen and the state of the file system is determined to be updated (all the IOs have been released), the operating frequencies are decreased. Under such conditions, the user is less likely to use the electronic device, and the task processing have been completed. In this case, both the user's use and the energy consumption of the electronic device can be taken into account through frequency decreasing.

In this application, the screen-off state is that the screen of the electronic device is off.

According to a third aspect, this application provides an electronic device, including one or more processors and one or more memories. The one or more processors are coupled to the one or more memories. The one or more memories are configured to store computer program code, and the computer program code includes computer instructions. When the one or more processors execute the computer instructions, the electronic device is enabled to perform the storage space organization method in any possible implementation of any one of the foregoing aspects.

According to a fourth aspect, this application provides an electronic device, including one or more functional modules. The one or more functional modules are configured to perform the storage space organization method in any possible implementation of any one of the foregoing aspects.

According to a fifth aspect, an embodiment of this application provides a computer storage medium, including computer instructions. When the computer instructions are run on an electronic device, the electronic device is enabled to perform the storage space organization method in any possible implementation of any one of the foregoing aspects.

According to a sixth aspect, an embodiment of this application provides a computer program product. When the computer program product is run on a computer, the computer is enabled to perform the storage space organization method in any possible implementation of any one of the foregoing aspects.

DETAILED DESCRIPTION OF ILLUSTRATIVE EMBODIMENTS

In embodiments of this application, words such as "first" and "second" are used to distinguish between same items or similar items that have basically same functions and purposes. For example, a first chip and a second chip are merely used to distinguish different chips, and are not intended to limit a sequence thereof. A person skilled in the art may understand that the words such as "first" and "second" do not limit a quantity and an execution order, and the words such as "first" and "second" do not indicate a definite difference.

It is to be noted that, in the embodiments of this application, the terms such as "exemplary" and "for example" are used to represent giving an example, an illustration or a description. Any embodiment or design scheme described as "exemplary" or "for example" in this application should not be construed as being more preferable or more advantageous than other embodiments or design schemes. Exactly, the terms such as "exemplary" or "for example" are intended to present related concepts in a specific manner.

In the embodiments of this application, "at least one" refers to one or more, and "a plurality" refers to two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following" or a similar expression thereof indicates any combination of these items, including a single item or any combination of a plurality of items. For example, at least one of a, b, or c may represent a, b, c, a and b, a and c, b and c, or a, b, and c, where a, b, and c may be singular or plural.

For ease of clearly describing the technical solutions of the embodiments of this application, some terms and technologies involved in the embodiments of this application are briefly introduced below:

(1) The Processing Process of Files at a Kernel Layer

Figure 1:
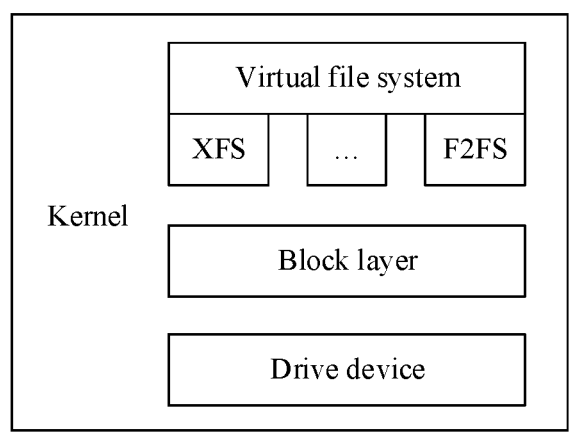
FIG. 1 is a schematic diagram of a layered structure of a kernel of an operating system according to an embodiment of this application.

The kernel layer is first-layer software expansion based on hardware, and provides most basic functions of the operating system. The kernel has functions such as managing a system process, an internal memory, a device driver program, and a file system. FIG. 1 is a schematic diagram of a layered structure (a schematic structural diagram of an IO stack) of a kernel of an operating system according to an embodiment of this application. As shown in FIG. 1, the file system belongs to the kernel layer (kernel) of the operating system, that is, all modules of the file system run in the kernel state. The kernel may include a virtual file system (virtual file system, VFS), different file systems, a block layer (Block layer), a device driver (device driver), and the like.

The virtual file system VFS defines an interface layer and an adaptation layer of a common file system, which, on the one hand, provides users with a set of unified access files, a directory, and a unified placement method of other objects, and on the other hand, needs to be adapted to different underlying file systems. Specifically, the VFS may abstract the common things of all file systems, for example, a general application programming interface (application programming interface, API) abstracted for structures such as a file, an index node inode, and a directory entry dentry, and then a specific file system needs to perform delivering according to the corresponding interface. That is, the VFS provides users with a unified interface, and introduces an intermediate layer between the user layer and the file system layer.

The basic data unit of a file system (file system) is a file. Its purpose is to manage files on the disk in an organized manner, and different file systems will be formed in different organization manners. According to different storage locations, file systems may be divided into three categories: disk file systems, virtual file systems, and network file systems. The function of the disk file system is to store data on a storage device such as a disk, and can perform operations such as opening, reading, and writing when a request is received. The file system may be, for example, the extended file system (extended file system, EXT) 2/3/4, an F2FS, an XFS, or a file allocation table (File Allocation Table, FAT) file system.

The block layer is a software logic layer that enables requests delivered to block devices to be completed efficiently and properly through organization and management. As shown in FIG. 1, the block layer is located at the upper layer of the drive device and hardware and the lower layer of the file system. That is, the block layer is an abstract layer on the real hardware, which shields different hardware drivers and is used to implement and optimize an IO scheduling policy.

The drive device (SCSI layer) may be an abstraction of a hardware device, including a UFS driver and an eMMC driver, and there is no limitation.

It can be seen from the above description that an IO enters the kernel from the user mode through system scheduling, and the path of the kernel is VFS, file system, block layer, and device driver layer. For example, when a user initiates a read-write operation, the user does not directly operate the storage device, but needs to go through a long IO stack to complete the data reading and writing. The read-write operation generally needs to sequentially go through the virtual file system vfs, the (disk) file system, the block layer, the drive device layer, and finally reach the storage device. After the device processing is completed, an interrupt notification driver program is sent.

(2) F2FS File System (Flash Friendly File System, F2FS) file system. This file system is a file system compiled based on the Linux kernel. It is a new open-source flash file system specially designed for NAND-based storage devices, which especially makes a friendly design for NAND flash storage media. NAND flash memory (flash memory) is a better storage device than a hard disk drive.

Figure 2:
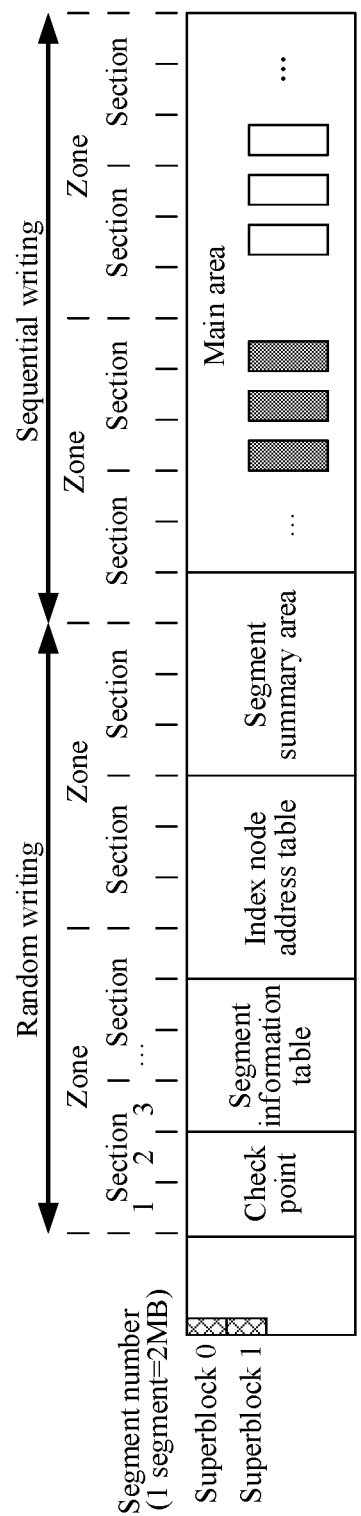
FIG. 2 is a schematic diagram of a storage space structure of an F2FS according to an embodiment of this application.

FIG. 2 is a schematic diagram of a storage space structure of an F2FS according to an embodiment of this application. As shown in FIG. 2, the entire storage space is divided into segments segment of a fixed size, where segment is the basic unit of F2FS space management, and the initial layout of file system metadata is determined. A certain quantity of consecutive segments form a section section, and a certain quantity of consecutive sections form a zone zone. Section (or segment) and zone are important units for F2FS log writing and cleaning. By configuring an appropriate section (or segment) size, the overhead of garbage collection at the flash translation layer (flash translation layer, FTL) can be greatly reduced. In addition, the storage space may be a space written in two manners: random writing and sequential writing.

The entire storage space of the F2FS is divided into 6 areas, which are respectively a super block (SB), a check point (CP), a segment information table (segment information table, SIT), an index node address table (node address table, NAT), a segment summary area (segment summary area, SSA), and a main area (main area).

It can be seen from the foregoing division of the storage space that in an F2FS system, in order to quickly write data in a continuous large disk space (storage device), a plurality of segments are obtained through division, and the data written into the storage space may be scattered in the storage space. Further, the plurality of segments facilitate the integration of the fragmented storage space, and the integration function of the storage space may be completed through a garbage collection (GC) mechanism.

(3) Garbage Collection (Garbage Collection, GC)

First, the GC processing process of the file system.

Because in the file system, due to the process of storage, reading and writing, and deletion of the file system, the storage space is often divided more finely, so that the degree of fragmentation of the file system will increase with the increase of usage time, and this fragmentation of the storage space is irreversible. Therefore, as the usage time of a computing device increases, the degree of fragmentation of the storage space of the device increases, and the time for the computing device to perform operations such as reading and writing on the storage space becomes longer, and the user's use of the computing device will become freezing. Therefore, in order to delay the increase of the degree of fragmentation as much as possible, the F2FS correspondingly has a GC scheme to organize the storage space.

Because the computing device performs operations such as writing, reading, and deletion on files in the storage space, the F2FS file system will release address spaces of the corresponding storage space, and these address spaces may be distributed on each segment of the storage space, resulting in that the idle (no data is stored) address spaces of the storage space may be scattered in various locations of the storage space. Therefore, the file system moves data on a segment with a relatively small amount of valid data to a segment currently in use through garbage collection of the F2FS, thereby releasing a complete segment space.

Specifically, the process of performing a GC operation by the file system may be divided into three steps. First, a moving target needs to be determined. For example, the file system may determine a target to be moved based on valid blocks of files on segments, and the update time or ages of the segments. Generally, a file on a segment with the fewest valid blocks and having not been updated or changed for a long time is selected for moving. Second, the file system may identify valid blocks and perform moving. Third, the file system releases the storage space after the moving. The segment with the fewest valid blocks refers to the segment of which valid data accounts for the least proportion of the entire space of the segment in the segments.

Figure 3:
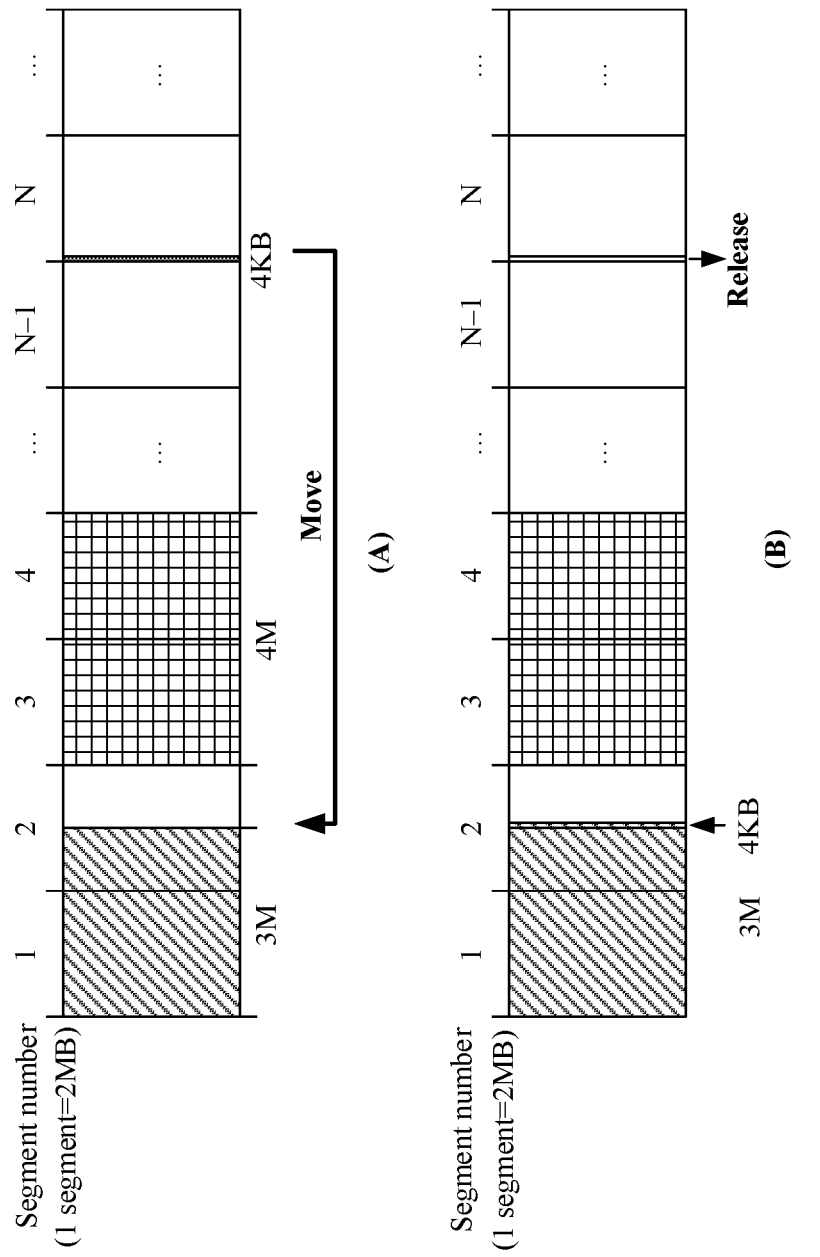
FIG. 3 is a schematic structural diagram of a storage space according to an embodiment of this application.

For example, FIG. 3 is a schematic structural diagram of a storage space according to an embodiment of this application. As shown in (A) of FIG. 3, the storage space includes more than N segments, and each segment has a size of 2 MB. N is a positive integer. In the storage space, a 3 MB file is stored on the first segment and the second segment, a 4 MB file is stored on the third segment and the fourth segment, and a 4 KB file is stored on the $N^{th}$ segment. Based on GC, the file system may determine the moving target is the 4 KB file stored on the $N^{th}$ segment, that is, the file with the fewest valid blocks on this segment, and this segment may be determined as the moving target. Subsequently, the file system may move the 4 KB file to a segment storage space immediately following the 3 MB file. As shown in (B) in FIG. 3, after the moving, the file system releases the original 4 KB file, and a corresponding storage space of the segment can be entirely released.

The GC process of the file system is performed based on the foregoing logical addresses, and for the storage space, space organization also needs to be performed. In this case, the organization process is often performed based on physical addresses.

Second, the GC processing process of the storage device.

The storage device in this application may be a NAND flash memory chip. NAND flash memory chip is an electronic erasable programmable read-only memory, and its characteristics are that the structure is simple, and a considerable amount of data storage can be realized in a semiconductor per unit area. The side effect of this structure is that bit cannot be used as a unit during erasing and writing, and only physical block can be used as a unit for performing large-scale operations. Physical blocks are storage areas of the flash memory chip, and each flash memory chip contains several physical blocks. Each physical block contains a constant quantity of physical pages. The physical block is also a basic unit of an erasing operation.

There is a mapping table between logical page addresses (logical addresses) and idle physical pages (physical addresses), which is a data structure that stores the one-to-one correspondence between the logical page addresses and the physical page addresses. Logical page address: It describes a general mechanism of blocks at which data on a computer storage device is located, refers to the address of a certain data block or the data block that a certain address points to, and may be converted by a flash translation layer to obtain a physical address. Idle physical page: When a physical page in a solid-state storage device has not been used, that is, it has no data, the physical page is an idle physical page, which may be used for request writing and allocation of and garbage collection operations.

In the garbage collection process of the storage device, valid data in a selected physical block is generally first transferred to another physical block, and then an erasing operation is performed on the selected physical block. Physical pages are reclaimed by erasing physical blocks with a relatively large amount of invalid data.

(4) Block Layer (Block Layer)

As shown in FIG. 1, the block layer is connected to the file system layer and the device driver layer. Starting from reception of a task by the block layer, bios enter the block layer. The block layer receives IO ports and processes these IO ports. These bios are abstracted by the block layer into requests request for management, and these requests leave the block layer and enter the device driver layer at appropriate time. After requests of input/output interfaces IOs are completed, the soft interrupt of the block layer is responsible for processing the work after IO completion. In this process, the block layer will occupy IOs and release IOs.

When the user uses the electronic device, if the function used by the user performs reading and writing on the disk, an IO port of the block layer will also be occupied. For example, the user views an album, a document, and the like of a mobile phone.

For example, when the foregoing F2FS file system performs IO processing, it also needs to occupy an IO port of the block layer and read and write disk data.

(5) Storage Protocol

The storage device completes storage according to a storage protocol, and the storage protocol involved in this application may include: an embedded multimedia card (embedded multi media card, eMMC) and universal flash storage (universal flash storage, UFS).

First, eMMC is a standard for flash memory cards, which defines a physical architecture, an access interface, and a protocol of a storage system based on an embedded multimedia card. eMMC may work synchronously, and the working mode is half-duplex. Each channel allows reading and writing transmission, but only reading/writing at the same time.

UFS is universal flash storage, and is a flash storage specification designed for consumer electronics such as digital cameras and smartphones. Its design goal is to develop a unified flash memory card format, and when providing a high data transmission speed and stability, it can also reduce consumers' confusion about various memory card formats on the market and the use of different memory card adapters. UFS adopts the serial data transmission technology. There are only two data channels, but the rate exceeds eMMC. The working mode is full-duplex mode. The same channel allows reading and writing channels, and reading and writing can be performed simultaneously, so that the transmission efficiency is improved. The storage device of the UFS protocol is much faster than the storage device of the eMMC protocol.

(6) Internal Memory

Internal memory, also referred to as a main memory, is a storage space that the CPU can directly perform addressing. Double data rate (double data rate, DDR) is an internal memory name, which means double-rate synchronous dynamic random access memory, and is one type of internal memory. The DDR has its operating frequency. A higher operating frequency indicates better performance of the DDR. Certainly, this is also accompanied by greater power consumption.

(7) Central Processing Unit (Central Processing Unit, CPU)

As a computing and control core of a computer system, the CPU is a final execution unit for information processing and program running. In the electronic device, the CPU is the core component responsible for reading instructions, decoding and executing instructions.

In addition, the CPU can control and allocate all hardware resources (for example, a memory) in the electronic device.

Each CPU has one or more operating frequencies. A higher operating frequency indicates better performance of the CPU. Certainly, this is also accompanied by greater power consumption.

Figure 4:
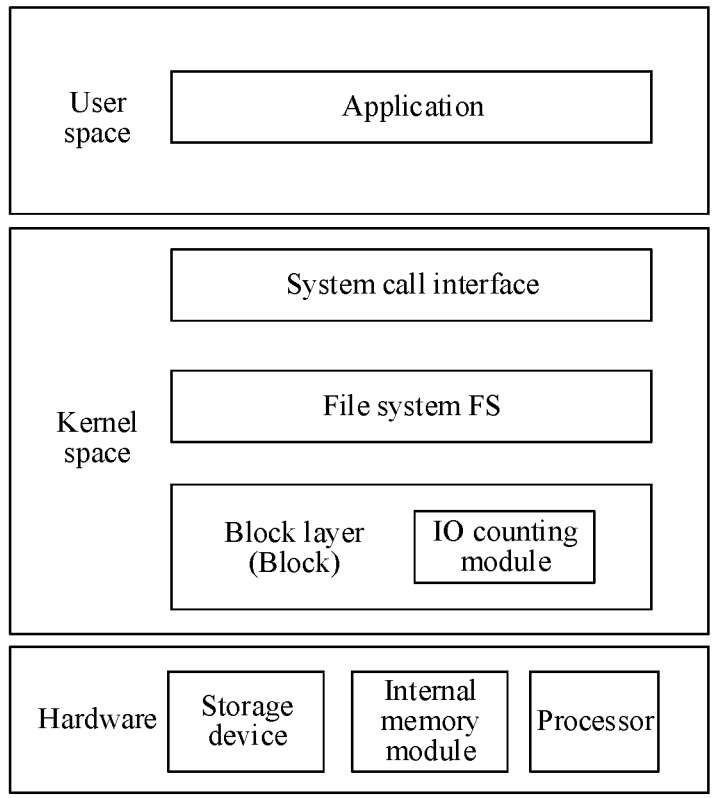
FIG. 4 is a schematic diagram of a layered structure of a kernel of an operating system according to an embodiment of this application.

Based on the foregoing description, FIG. 4 is a schematic diagram of a layered structure of a kernel of an operating system according to an embodiment of this application. As shown in FIG. 4, the layered structure of the kernel may include three parts: user space (user space), kernel space (kernel space), and hardware. The operating system may be divided into two parts. One part is the core software, also referred to as the kernel space, which runs at a relatively high privilege level and has all the permissions to access the hardware devices. The other part is referred to as user space. Ordinary applications run in the user space, and the ordinary applications cannot directly access the kernel space and the hardware devices.

The user space may include applications. The applications may be applications such as gallery, reading, ** game, and camera, which are not limited in this application.

The kernel space may include a system call interface (system call interface), a file system, a block layer, and the like.

The system call interface is the bridge between the user space and the kernel space. The applications access the hardware resources in the system through the unified entry, namely, the system call interface. Through this interface, all resource access is performed under the control of the kernel, so as to avoid unauthorized access to system resources by user programs, thereby ensuring the security and stability of the system. That is, the system call interface is an interface configured to receive a file processing task from the user layer.

The file system is a method and data structure used by the operating system to specify files on a disk or a partition, that is, an organization method of the data on the disk. The file system can properly plan the hard disk to ensure satisfaction of the normal use needs of the user. The file system is specifically configured to create files, store, read, modify, and transfer files, and the like for the user. There may be various file systems, such as F2FS, EXT4, and FAT, which is not limited in this application.

For the description of the block layer (Block layer), reference may be made to the foregoing description. In the embodiments of this application, the block layer may include an IO counting module, which is configured to count an IO occupation quantity (or an IO idleness quantity), and the like. For the relevant content of the IO counting module, reference may be made to the description in FIG. 6A and FIG. 6B, and details are not described herein.

The hardware may include a storage device, an internal memory (modules), a processor, and the like.

The storage device may be configured to store files or data, and is, for example, a hard disk or a disk. The protocol type of the storage device may be UFS or eMMC, and for details, reference may be made to the foregoing description.

The internal memory is configured to temporarily store operational data of the processor and data exchanged by storage devices such as hard disks. All programs in the electronic device run in the internal memory, and the performance of the internal memory affects the overall performance of the computer. In this application, the version of the internal memory may be DDR.

The processor may be the CPU of the electronic device. For a specific introduction, reference may be made to the foregoing description, and details are not described herein.

In the embodiments of this application, after the file system performs GC detection, the file system may determine whether the disk state of the computing device is idle. When the disk state is the idle state, the file system may send a GC detection notification to the block layer. After determining the current IO port result, the block layer may send the IO port state result to the file system. The file system may determine whether to perform GC processing based on the IO port state result.

For the computing device, the quantity of IOs of the Block layer is limited. Common file operations in user mode and delivering of IO logs of the file system will cause occupation of IOs of the block layer, for example, the user operating the computing device to open a file, or behaviors of the file system such as IO read ahead and dirty page write-back. That is, when the Block layer receives a task, an IO port will be called (or occupied), and when the file system of the computing device performs GC processing, an IO port will also be called. If a user operation process and GC processing are simultaneously performed, the IO resources of the Block layer will be preempted. The computing device need to perform user operations sequentially, and tasks that need to be processed by the user operations may be delayed, consequently affecting the user experience.

Before the F2FS performs GC processing, whether a GC process can be started needs to be determined. The state of F2FS includes two states: busy busy and idle idle. The busy state represents that the F2FS file system is working (there is a process being processed) currently; and the idle state represents that the F2FS file system is not working (no process needs to be processed). Because a process of the F2FS and IO ports of the Block layer need to be occupied during the GC processing, the F2FS will select a time during which the F2FS is in the idle state and the Block layer still has idle IOs for the GC processing.

In order to prevent the foregoing GC processing process from preempting the IO bandwidth and the process of the F2FS during the user's use, the computing device may periodically perform GC detection through the file system, to ask whether it is in the idle state and whether the Block layer currently has an IO port for calling. When it is determined that the file system is in the idle state and the Block layer has an IO port, the file system performs the GC processing, that is, starts the GC process. Otherwise, skip starting the GC processing.

The foregoing GC detection process is triggered periodically according to a specific duration. In other words, whether to start the GC process is determined only based on a result of determining the FS state and a result of determining the IO ports of the Block layer at a certain time point of the same duration. If there is a user operation that is using the file system at this time point, the FS system will not start the GC processing process.

Figure 5:
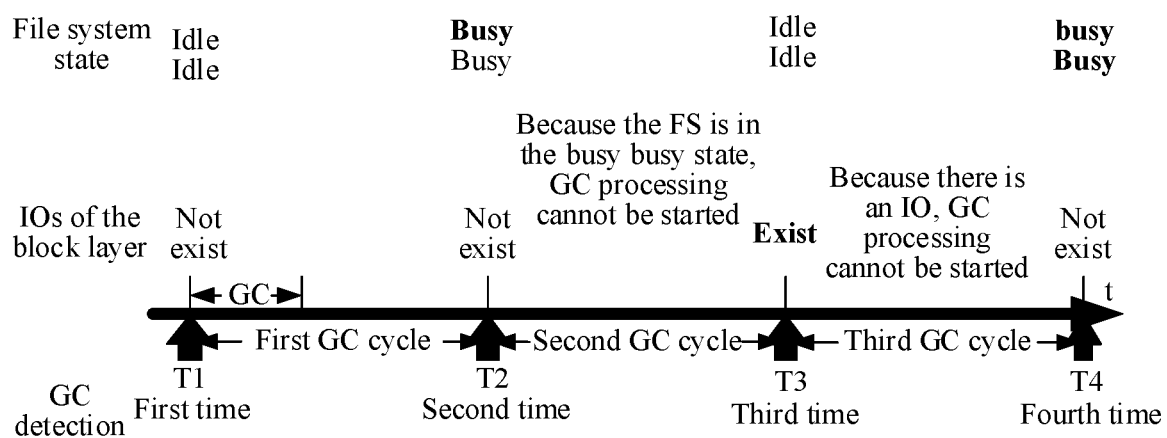
FIG. 5 is a schematic diagram of a GC detection process according to an embodiment of this application.

For example, FIG. 5 is a schematic diagram of a GC detection process according to an embodiment of this application. As shown in FIG. 5, the file system may perform GC detection periodically. For example, at a time point T1, first-time GC detection is triggered, and it is found through determining that the state of the FS (file system) is idle, and IOs of the block layer are "not exist", that is, no IO is occupied (all IOs have been released). Therefore, the file system may start a GC process. After a duration of one GC cycle, at a time point T2, second-time GC detection is triggered. Because the FS is busy in the detection process, the file system ends the second GC cycle and waits for the next GC cycle. At a time point T3, third-time GC detection is triggered. Because IOs of the block layer are "exist" (there are IOs occupied, that is, there are still IOs having not been released), the GC processing cannot be started, and the third GC cycle is missed. At a time point T4, the GC process cannot be started due to the same reason as the second GC cycle.

In the foregoing process, because the triggering of the GC process is determined periodically, the determining of the busy state and the idle state of the file system is not sufficiently accurate. In addition, the IO occupation of user operations conflicts with the IO occupation of the GC process, which exacerbates the situation that the file system misses the start of a GC cycle. A higher frequency of the GC processing indicates that the disk space will be organized more orderly; and a longer time for which no GC process is performed means that the disk space is occupied more disorderly, the process of reading the disk by the file system is longer, and freezing of the electronic device will occur earlier.

In the embodiments of this application, the electronic device may monitor the IOs of the Block layer. In a case of IO release, whether any IOs are currently occupied is determined. If no IO is occupied, the file system may determine the state of the file system as the idle state, trigger GC detection, and perform the first GC processing. In addition, the block layer may notify the storage device to perform the second GC processing. In this way, the block layer monitors IO occupancy, and when all the IOs are released, actively changes the state of the file system to the idle state, actively triggers GC detection, and starts a GC process, so that the idle timing of the electronic device can be better grasped, thereby reducing the quantity of times of GC window missing due to the conflict caused by that both the GC detection and user operations occupy the IO ports of the Block layer, and improving the success rate of the GC process of the electronic device. The probability of determining execution of GC processing through GC detection increases, and the quantity of times for which storage devices such as disks of the electronic device are organized increases, thereby delaying freezing of the electronic device and prolonging the service life of the electronic device.

Figure 6A:
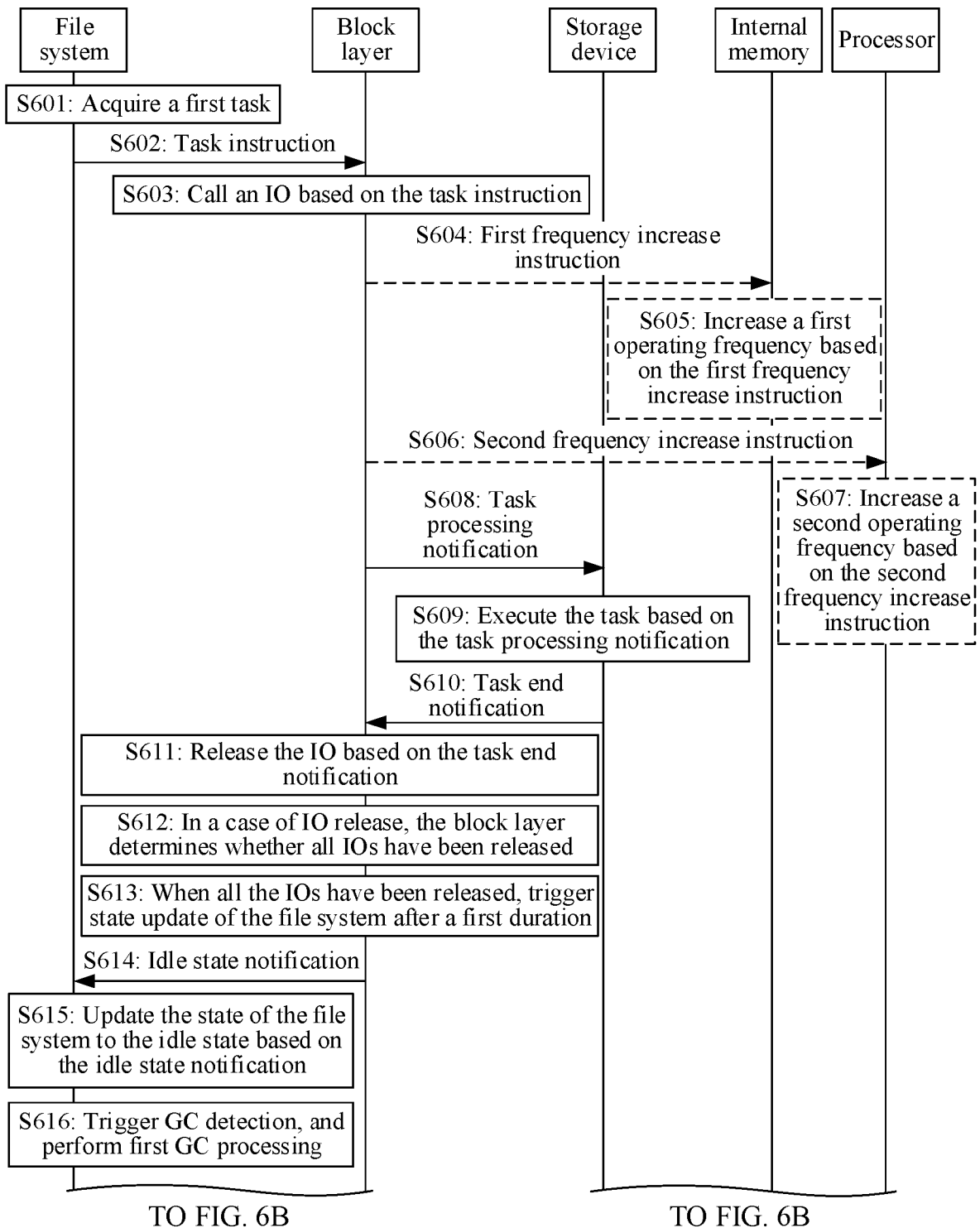
FIG. 6A and FIG. 6B are a schematic diagram of a process of a file garbage collection method according to an embodiment of this application.
Figure 6B:
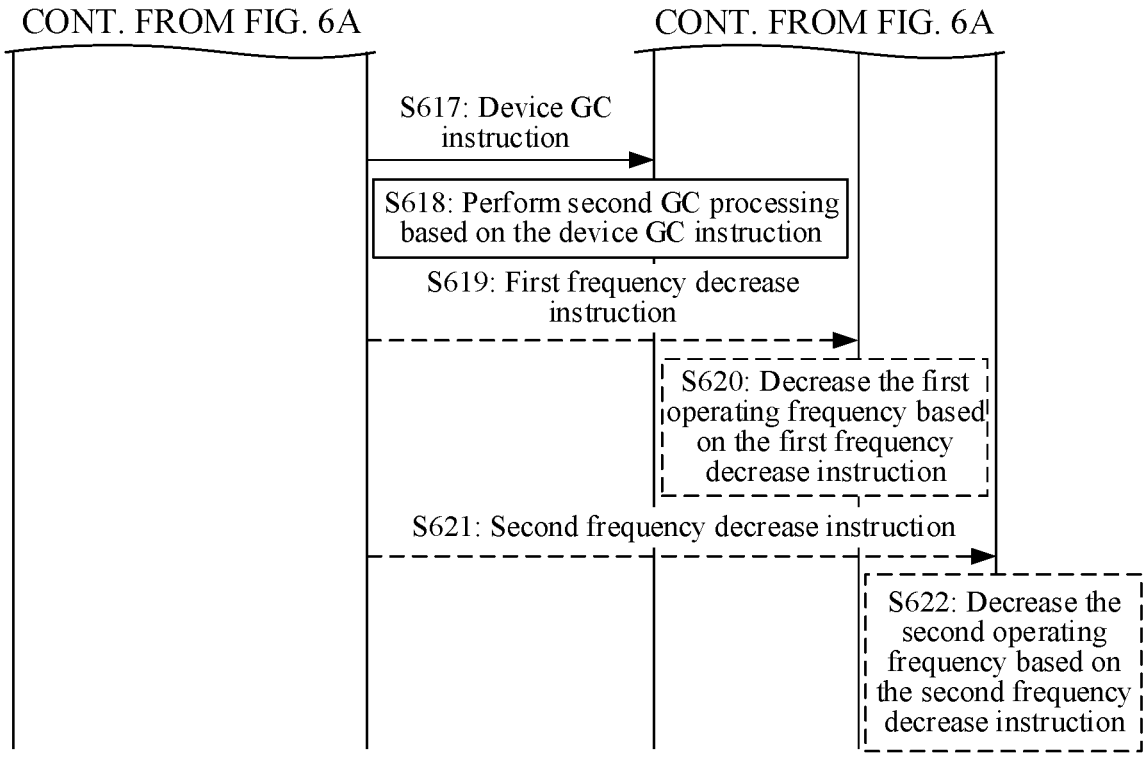

FIG. 6A and FIG. 6B are a schematic diagram of a process of a file garbage collection method according to an embodiment of this application. As shown in FIG. 6A and FIG. 6B, the electronic device may include, but not limited to, the following steps:

The electronic device may include five parts: a file system (for example, an F2FS, an EXT4, or a FAT), a block layer (Block layer), a storage device (UFS/eMMC), an internal memory (DDR), and a processor (CPU). For the description of each part, reference may be made to the relevant description in FIG. 5. Details are not described herein again.

S601: The file system acquires a first task.

The first task is a task for performing a reading and/or writing operation on a certain file stored in the storage device for a file request.

When processing various task processes, in a case that a reading and/or writing operation needs to be performed on locally stored files, the electronic device may send a task request to the file system. In this case, the file system may acquire task requests from other modules (or some applications), that is, the file system acquires the first task based on the task requests.

In a possible implementation, a first application of the electronic device may acquire a user operation for opening a first file, and in response to the above user operation, the first application may deliver a (reading and/or writing) task request for the first file to the file system. After receiving the task request, the file system may generate the first task based on a first task request. The first task is a task for the first file.

For example, the user clicks a gallery control on a desktop of the electronic device, and in response to the above user operation, the gallery application (first application) sends a task request for opening a picture database (first file) to the file system. The file system establishes or generates the first task based on the task request for the picture database. The first task may be performing reading and writing (for example, viewing or editing) on the picture database.

For the process in which the first application delivers a (reading and/or writing, and the like) task request for the first file to the file system, reference may be made to the foregoing process in which the application accesses the file system through the system call interface, and reference may be made to the relevant description in FIG. 4. Details are not described herein.

It is to be noted that, there are also other possible manners for the file system to acquire the first task, which is not limited in this application.

S602: The file system sends a task instruction to the block layer.

When acquiring the first task, the file system may send a task instruction to the block layer. Correspondingly, the block layer receives the task instruction from the file system. The task instruction instructs the block layer to process the first task.

S603: The block layer calls an IO based on the task instruction.

After receiving the task instruction from the file system, the block layer may call an idle IO port based on the task instruction. In this case, the quantity of idle IO ports is decreased by one, that is, the quantity of occupied IOs is increased by one, and it can be determined that the block layer currently has a task to be processed.

In an implementation, the block layer may include an IO counting module. The IO counting module a current IO occupation quantity (which may alternatively be an IO idleness quantity). When the task instruction is acquired from the file system, the IO counting module may determine that the current occupation quantity is increased by one (the IO idleness quantity is decreased by one). The IO occupation quantity is the quantity of IO ports called by the block layer, and the IO idleness quantity is the quantity of IO ports not called by the block layer.

It is to be noted that, one task instruction corresponds to a change of one in the IO occupation (or idleness) quantity.

Optionally, if all the IOs of the block layer have been released before the block layer receives the task instruction, in this case, the file system is in an idle state. After receiving the task instruction, the block layer of the electronic device may immediately trigger state update of the file system. That is, when the quantity of idle IOs monitored by the electronic device changes from 0 to 1, the state of the file system may be triggered to be updated to the busy state. Specifically, when the IO counting module of the block layer monitors that the IOs are changed from being fully released to there being IO occupation, the block layer sends a busy state notification to the file system. After the file system receives the busy state notification, the state of the file system is updated to the busy state based on the busy state notification.

S604: The block layer sends a first frequency increase instruction to the internal memory.

After determining that the task of the file system occupies an IO port, the block layer may send a first frequency increase instruction to the internal memory. Correspondingly, the internal memory may receive the first frequency increase instruction from the block layer.

In this embodiment of this application, frequency instructions may include frequency increase instructions and frequency decrease instructions. The first frequency increase instruction is an indication used for instructing the internal memory to increase the current operating frequency. Optionally, the first frequency increase instruction may include frequency information 1. The frequency information 1 may indicate that the operating frequency of the internal memory is changed to the frequency information 1. The current operating frequency of the internal memory is lower than the frequency of the frequency information 1. Optionally, the first frequency increase instruction may include a frequency increase signal. For example, 1 indicates a frequency increase, and 0 indicates a frequency decrease. The first frequency increase instruction may include a "1" for indicating a frequency increase.

In a possible implementation, the block layer may first determine whether the internal memory is currently operating at a low frequency (at least has not reached the state of the highest-frequency operation, and still needs to further increase the frequency). If a frequency change instruction sent by the block layer to the internal memory the latest time before S604 is a frequency decrease instruction (for details, reference may be made to the description of S619, and the details are not described herein), the block layer may determine that the current operating frequency of the internal memory still needs to be increased and can be increased. In this case, the block layer may send the first frequency increase instruction to the internal memory.

In another possible implementation, the block layer does not need to determine whether the internal memory is currently operating at a low frequency, and may directly send the first frequency increase instruction to the internal memory. In this case, the internal memory determines whether to increase the frequency based on the first frequency increase instruction.

It is to be noted that, in this application, the operating frequency of the internal memory may have different levels, and may have a high frequency level and a low frequency level, or a high frequency level, an intermediate frequency level, and a low frequency level, or the like, which is not limited in this application.

In this embodiment of this application, the internal memory may be a DDR or others, which is not limited.

S605: The internal memory increases a first operating frequency based on the first frequency increase instruction.

After acquiring the first frequency increase instruction, the internal memory may increase its (the first) operating frequency based on the first frequency increase instruction.

For example, the current operating frequency of the internal memory is in a low-frequency state, and the received first frequency increase instruction includes the frequency information 1, then the internal memory may adjust the current operating frequency to a frequency corresponding to the frequency information 1.

For example, the current operating frequency of the internal memory is in a low-frequency state, and the received first frequency increase instruction includes a frequency increase signal, then the internal memory may increase the current operating frequency to a frequency of an adjacent higher level, or to a frequency of the highest level, which is not limited.

In the embodiments of this application, the internal memory increases the first operating frequency based on the first frequency increase instruction. The first operating frequency after the increase is higher than the first operating frequency before the increase, and the increment is not limited.

S606: The block layer sends a second frequency increase instruction to the processor.

After determining that the task of the file system occupies the IO port, the block layer may send a second frequency increase instruction to the processor. Correspondingly, the processor may receive the second frequency increase instruction from the block layer.

The second frequency increase instruction is an indication used for instructing the processor to increase the current operating frequency. Optionally, the first frequency increase instruction may include frequency information 2. The frequency information 2 may indicate that the operating frequency of the processor is changed to the frequency information 2. The current operating frequency of the processor is lower than the frequency of the frequency information 2. Optionally, the second frequency increase instruction may include a frequency increase signal. For details, reference may be made to relevant descriptions of S604, and the details are not described herein.

In a possible implementation, the block layer may first determine whether the processor is currently operating at a low frequency (at least has not reached the state of the highest-frequency operation, and still needs to further increase the frequency). If a frequency change instruction sent by the block layer to the processor the latest time before S604 is a frequency decrease instruction (for details, reference may be made to the description of S621, and the details are not described herein), the block layer may determine that the current operating frequency of the internal memory needs to be increased. In this case, the block layer may send the second frequency increase instruction to the processor.

It is to be noted that, in this application, the operating frequency of the processor may have different levels, and may have a high frequency level and a low frequency level, or a high frequency level, an intermediate frequency level, and a low frequency level, or the like, which is not limited in this application.

Optionally, before performing S604 and S606, the block layer may determine whether the current quantity of occupied IOs is greater than (or equal to) a first quantity through the IO counting module, and if the current quantity of occupied IOs is greater than (or equal to) the first quantity, S604 and S606 may be performed. The first quantity may be 5, 10, 15, 20, or the like, which is not limited. In this way, the electronic device can increase the frequency in a case of a certain degree of IO occupation. The necessity of frequency increasing is ensured, so as to fully adapt to the needs of the electronic device for processing file tasks, thereby taking energy consumption into account while ensuring efficient execution.

S607: The processor increases a second operating frequency based on the second frequency increase instruction.

After acquiring the second frequency increase instruction, the processor may increase its (the second) operating frequency based on the second frequency increase instruction.

In the embodiments of this application, the processor increases the operating frequency based on the second frequency increase instruction. The operating frequency after the increase is higher than the operating frequency before the increase, and the increment is not limited. For details of the increase process, reference may be made to the description of S605 above, and the details are not described herein.

In the process of steps S604 to S607, because the operating frequency can be increased based on the occupancy of the IO ports, to dynamically adapt to the intensity of the current task, it is ensured that during the user' use, or when the processing task is relatively heavy, the processing speed can meet the task requirements, thereby avoiding problems of an excessively long processing time and poor user experience.

S608: The block layer sends a task processing notification to the storage device.

After determining that the task of the file system occupies an IO port, the block layer may send a task processing notification to the storage device. Correspondingly, the storage device may receive the task processing notification from the block layer.

The task processing notification is used for instructing the storage device to process the first task.

It is to be noted that, after receiving the instruction task of the file system, the block layer may send a task processing notification to the storage device. There may be one or more sent task notifications, which depends on specific division and processing of the block layer. This is not limited in this application. In this application, the storage device included in the electronic device may be of an UFS or eMMC type.

The execution order of steps S604, S606, and S608 is not limited.

Optionally, the block layer may send a third frequency increase instruction to the storage device, and correspondingly, the storage device may receive the third frequency increase instruction from the block layer. After receiving the third frequency increase instruction, the storage device may increase a third operating frequency based on the third frequency increase instruction. The third operating frequency is the operating frequency of the storage device.

S609: The storage device executes the task based on the task processing notification.

After receiving the task processing notification from the block layer, the storage device may execute the task based on the task processing notification That is, the storage device needs to process the first task, determine a data location based on the task processing notification, and perform operations such as reading and/or writing.

S610: The storage device sends a task end notification to the block layer.

After completing execution of the task based on the task processing notification, the storage device may send a task end notification to the block layer. Correspondingly, the block layer may receive the task end notification from the storage device.

The task end notification indicates that the current first task has been processed.

S611: The block layer releases the IO based on the task end notification.

After receiving the task end notification from the storage device, the block layer may release the IO based on the task end notification. The current quantity of idle IO ports is increased by one, that is, the quantity of occupied IOs is decreased by one.

In an implementation, the block layer may include an IO counting module. The IO counting module a current IO port occupation quantity (which may alternatively be an IO idleness quantity). When the task end notification is acquired from the storage device, the IO counting module may determine that the current IO occupation quantity is decreased by one (or the IO idleness quantity is increased by one).

It is to be noted that, one task end instruction corresponds to a change of one in the IO occupation (or idleness) quantity.

S612: In a case of IO release, the block layer determines whether all IOs have been released.

The block layer may determine the IO occupation quantity or the IO idleness quantity, and determine whether any IOs are currently occupied. That is, the block layer may determine whether the IO occupation quantity is 0 (or whether the IO idleness quantity is the total quantity of IOs).

In a possible implementation, in the case of IO release (that is, when the IO occupation quantity is decreased), (the IO counting module of) the block layer determines the IO occupation quantity, and determines whether the current IO occupation quantity is 0. When the IO occupation quantity is 0 (that is, no IO is occupied), the block layer may perform S613; otherwise (there are IOs occupied), continue to monitor the IO occupation quantity, and skip performing S613.

In another possible implementation, when (the IO counting module of) the block layer determines that the IO idleness quantity is increased, whether the current IO idleness quantity is the total quantity of IOs is determined. When the IO idleness quantity is the total quantity of IOs (no IO ports are occupied), the block layer may perform S613; otherwise (there are IOs occupied), continue to monitor the IO idleness quantity, and skip performing S613.

S613: When all the IOs have been released, the block layer triggers state update of the file system after a first duration.

When all the IOs have been released (it is determined that no IO is occupied), the block layer may trigger state update of the file system after the first duration. That is, the block layer may trigger the execution process of steps S614 and S615.

The first duration may be 1 ms, 1 s, 5 min, or the like. In this application, the range of the first duration may be 1 ms to 10 min, or the like, and the duration is not limited. An update instruction of a file state is triggered after the first duration, to ensure that there is no task instruction for file processing within a period of time as much as possible, and ensure that GC processing is performed when IO resources of the block layer are idle, thereby avoiding IO conflicts with user operations, and increasing the possibility of successful GC processing while ensuring the user experience. On the other hand, based on the first duration, excessively frequent switching to the idle state can be avoided, thereby reducing the consumption of the processing resources and energy.

S614: The block layer sends an idle state notification to the file system.

When no IO is occupied, the block layer may send an idle state notification to the file system after the first duration. Correspondingly, the file system may receive the idle state notification from the block layer.

The idle state notification may be an instruction for instructing the file system to switch the state to the idle state. The state of the file system includes idle and busy. The idle state indicates that there is no task to be processed currently.

S615: The file system updates the state of the file system to the idle state based on the idle state notification.

After receiving the idle state notification from the block layer, the file system may update the state of the file system to the idle state based on the idle state notification. That is, when all the IOs have been released, the electronic device updates the state of the file system to the idle state through the block layer. The state of the file system may be the idle (idle) or busy (busy) state before the update, which is not limited. After the update, the state of the file system is the idle state.

In this embodiment of this application, by monitoring an IO window, when the block layer releases an idle IO port, whether any IO ports are still occupied currently may be determined once, and if no IO port is occupied, the state of the file system may be switched to idle. Updating the state of the file system to idle facilitates the subsequent GC processing process, thereby improving the probability of completion of the GC processing.

S616: The file system triggers GC detection, and performs first GC processing.

After the state of the file system is updated to the idle state, the file system may trigger GC detection and perform first GC processing. That is, the file system may start GC detection and determine GC.

The file system may trigger the GC detection, and the file system may perform the GC processing when the state of the file system is idle and there are idle IOs at the block layer.

The first GC processing refers to a GC operation performed by the file system. The first GC processing is a garbage collection mechanism performed by the file system according to logical addresses. For details, reference may be made to the foregoing GC process of the file system, and the details are not described herein.

S617: The block layer sends a device GC instruction to the storage device.

After triggering the state update of the file system, the block layer may send a device GC instruction to the storage device. Correspondingly, the storage device may receive the device GC instruction from the block layer.

The device GC instruction refers to an IO generated by the GC at the block layer, and the device GC instruction may be acquired from the file system, and instructs the storage device to perform second GC processing.

S618: The storage device performs second GC processing based on the device GC instruction.

After receiving the device GC instruction from the block layer, the storage device may perform the second GC processing based on the device GC instruction.

The second GC processing may be a garbage collection mechanism performed by the storage device according to physical addresses. For details, reference may be made to the foregoing GC process in the storage device, and the details are not described herein.

S619: The block layer sends a first frequency decrease instruction to the internal memory.

After triggering the state update of the file system, the block layer may send a first frequency decrease instruction to the internal memory. Correspondingly, the internal memory may receive the first frequency decrease instruction from the block layer.

The first frequency decrease instruction is an indication used for instructing the internal memory to decrease the current operating frequency. Optionally, the first frequency increase instruction may include frequency information 1. The frequency information 1 may indicate that the operating frequency of the internal memory is changed to the frequency information 1. The current operating frequency of the internal memory is higher than the frequency of the frequency information 1. Optionally, the first frequency decrease instruction may include a frequency decrease signal. For example, 1 indicates a frequency increase, and 0 indicates a frequency decrease. The first frequency decrease instruction may include a "0" for indicating a frequency decrease.

In a possible implementation, the block layer may first determine whether the internal memory is currently operating at a high frequency (at least has not reached the state of the lowest-frequency operation, and still needs to further decrease the frequency). If a frequency change instruction sent by the block layer to the internal memory the latest time before S619 is a frequency increase instruction (for details, reference may be made to the description of S604, and the details are not described herein), the block layer may determine that the current operating frequency of the internal memory still needs to be decreased and can be decreased. In this case, the block layer may send the first frequency decrease instruction to the internal memory.

In another possible implementation, the block layer does not need to determine whether the internal memory is currently operating at a high frequency, and may directly send the first frequency decrease instruction to the internal memory. In this case, the internal memory determines whether to decrease the frequency based on the first frequency decrease instruction.

In a possible implementation, after the block layer triggers the state update of the file system, whether the electronic device is in a screen-off state may be determined. When the electronic device is in the screen-off state, the block layer sends the first frequency decrease instruction to the internal memory; otherwise, the block layer cannot send the first frequency decrease instruction. In this way, when the screen of the electronic device is off, the user often does not use the electronic device, and the probability that the internal memory of the electronic device is idle is greater. In this case, by decreasing the operating frequency, the processing speed of the internal memory is decreased, thereby reducing the power consumption while ensuring the user experience.

S620: The internal memory decreases the first operating frequency based on the first frequency decrease instruction.

After acquiring the first frequency decrease instruction, the internal memory may decrease its operating frequency based on the first frequency decrease instruction.

For example, the current operating frequency of the internal memory is in a low-frequency state, and the received first frequency decrease instruction includes the frequency information 1, then the internal memory may adjust the current operating frequency to a frequency corresponding to the frequency information 1.

For example, the current operating frequency of the internal memory is in a low-frequency state, and the received first frequency decrease instruction includes a frequency decrease signal, then the internal memory may decrease the current operating frequency to a frequency of an adjacent lower level, or to a frequency of the lowest level, which is not limited.

In the embodiments of this application, the internal memory decreases the operating frequency based on the first frequency decrease instruction. The operating frequency after the decrease is higher than the operating frequency before the decrease, and the decrement is not limited.

S621: The block layer sends a second frequency decrease instruction to the processor.

After triggering the state update of the file system, the block layer may send a second frequency decrease instruction to the processor. Correspondingly, the processor may receive the second frequency decrease instruction from the block layer.

The second frequency decrease instruction includes an indication used for instructing the processor to decrease the current operating frequency. Optionally, the second frequency decrease instruction may include frequency information 2. The frequency information 2 may indicate that the operating frequency of the processor is changed to the frequency information 2. The current operating frequency of the processor is higher than the frequency of the frequency information 2. Optionally, the second frequency decrease instruction may include a frequency decrease signal. For details, reference may be made to relevant descriptions of S619, and the details are not described herein.

In a possible implementation, after the block layer triggers the state update of the file system, whether the electronic device is in a screen-off state may be determined. When the electronic device is in the screen-off state, the block layer sends the second frequency decrease instruction to the processor; otherwise, the block layer cannot send the second frequency decrease instruction. In this way, when the screen of the electronic device is off, the user often does not use the electronic device, and the probability that the processor of the electronic device is idle is greater. In this case, by decreasing the operating frequency, the computing speed of the processor is decreased, thereby reducing the power consumption while ensuring the user experience. This processing process and the processing process in S619 may be the same processing process.

In addition, there is another process of determining whether to send the second frequency decrease instruction to the processor in S621. For details, reference may be made to relevant descriptions in S619, and the details are not described herein.

The execution order of steps S614, S617, S619, and S621 is not limited.

S622: The processor decreases the second operating frequency based on the second frequency decrease instruction.

After acquiring the second frequency decrease instruction, the processor may decrease the operating frequency of the processor based on the second frequency decrease instruction.

In the embodiments of this application, the processor decreases the operating frequency based on the second frequency decrease instruction. The operating frequency after the decrease is higher than the operating frequency before the decrease, and the decrement is not limited. For details of the decrease process, reference may be made to the description of S621 and S620 above, and the details are not described herein.

In the process of steps S619 to S622, because the operating frequency can be decreased based on the idleness of the IO ports, to dynamically adapt to the intensity of the current task, it is ensured that during the user' use, the frequency can be decreased and the power consumption can be reduced.

Optionally, the block layer may send a third frequency decrease instruction to the storage device, and correspondingly, the storage device may receive the third frequency decrease instruction from the block layer. After receiving the third frequency decrease instruction, the storage device may decrease the current third operating frequency based on the third frequency decrease instruction. The third operating frequency is the operating frequency of the storage device.

It is to be noted that, the processes of S604 to S607 and S619 to S622 cannot be viewed separately, and are both processes of adjusting the operating frequency based on the IO usage, which can reduce the power consumption while ensuring the task intensity and the user experience.

Figure 7:
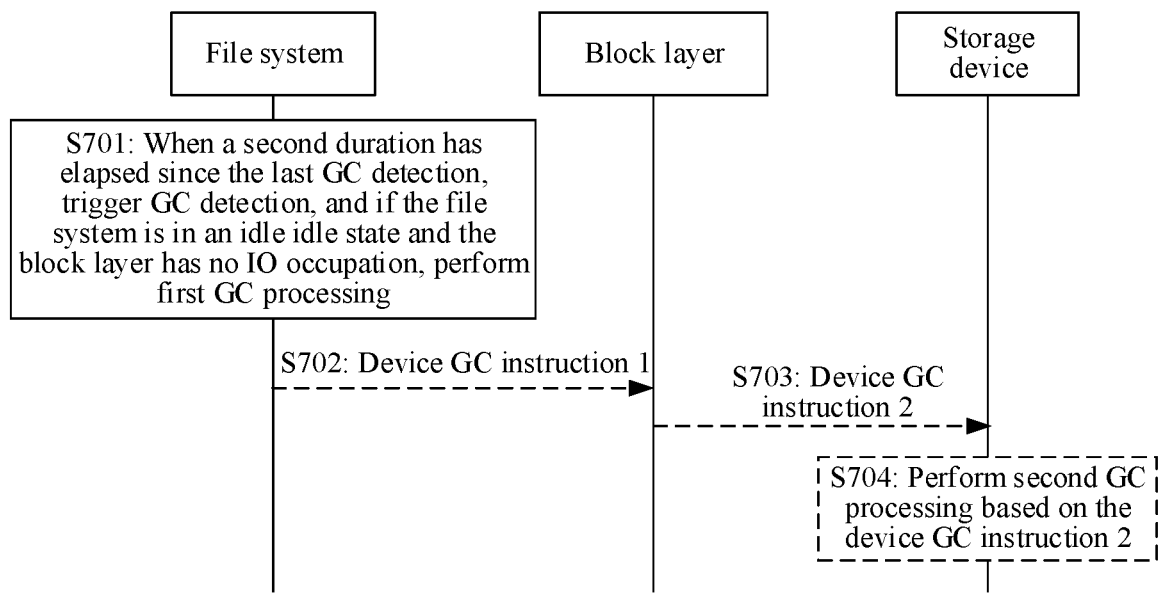
FIG. 7 is a schematic diagram of a process of another file garbage collection method according to an embodiment of this application.

Based on the description of FIG. 6A and FIG. 6B above, FIG. 7 is a schematic diagram of a process of another file garbage collection method according to an embodiment of this application. As shown in FIG. 7, the electronic device may include, but not limited to, the following steps:

S701: When a second duration has elapsed since the last GC detection, trigger GC detection, and if the file system is in an idle state and the block layer has no IO occupation, perform first GC processing.

The second duration may be 2 ms, 1 s, 5 s, 5 min, or the like, which is not limited.

The last GC detection may be GC detection triggered periodically like this time, or may be GC detection triggered because the block layer detects that all the IOs are released and when the file system is updated to the idle state in FIG. 6A and FIG. 6B above, which is not limited. That is, it may be understood that after each GC detection, timing starts, and when a duration reaches the second duration, GC detection is restarted. If the GC detection triggered because the Block layer detects that all the IOs are released and when the file system is updated to the idle state has already been performed before the second duration has elapsed, the timing is restarted.

After the GC detection is triggered, determining of the file system state and the IOs of the block layer needs to be performed. If the file system is in the idle state and the Block layer has no IO occupation, first GC processing is performed; otherwise, GC processing is skipped. For details, reference may be made to the description of S616 in FIG. 6A and FIG. 6B and relevant descriptions of FIG. 5, and details are not described herein.

S702: The file system sends a device GC instruction 1 to the block layer.

Optionally, when the GC detection is triggered, the file system may send a device GC instruction 1 to the block layer. Correspondingly, the block layer may receive the device GC instruction 1 from the file system. The device GC instruction 1 may be an instruction for the storage device to perform a GC operation.

S703: The block layer sends a device GC instruction 2 to the storage device.

Optionally, after receiving the device GC instruction 1 from the file system, the block layer may send a device GC instruction 2 to the storage device. The device GC instruction 2 and the device GC instruction 1 may have the same meaning and contained information, and both are instructions for the storage device to perform a GC operation.

S704: Perform second GC processing based on the device GC instruction 2.

For S703 and S704, reference may be made to the description of S617 and S618 above, and details are not described herein.

In the foregoing embodiment, the electronic device processes the GC detection that can be triggered when the Block layer detects that all the IOs are released and the file system is updated to the idle state, and can further perform GC detection periodically to ensure the intensity and the frequency of the GC detection. The GC detection can trigger the GC processing, so as to ensure the frequency of the GC processing, ensure the storage device to frequently perform organization operations such as garbage collection, and delay the process of fragmentation of the storage space, thereby prolonging the service life of the electronic device as much as possible and improving the user experience.

In the embodiments of this application, the range of the second duration is 5 ms to 60 min, for example, 30 ms, 1 s, 10 min, or 30 min, which is not limited in this application. The first duration and the second duration may be fixed durations or variable durations, which may be related to the degree of dirty of the storage space, which is not limited in this application.

In the foregoing two implementations, only the situation that the triggering manner of the GC detection is that the block layer detects the IO conditions for triggering is described. Based on the above, the file system also periodically performs GC detection according to the second duration.

For example, the file system performs step S616, that is, after the GC detection is triggered, timing is started, and after the second duration, the GC detection may be started again. After the GC detection is started, whether there are idle IOs and whether the file system is in the idle state are determined. If the foregoing conditions are met, the electronic device may start performing GC processing. Otherwise, perform the GC processing. This process is the same as that in FIG. 4, and details are not described herein.

It is to be noted that, when the situation in FIG. 6A and FIG. 6B that all the IO ports are released and the GC is actively triggered does not exist, GC detection is all performed according to a cycle. The active GC detection in FIG. 6A and FIG. 6B will break the cycle of the GC detection.

Figure 8:
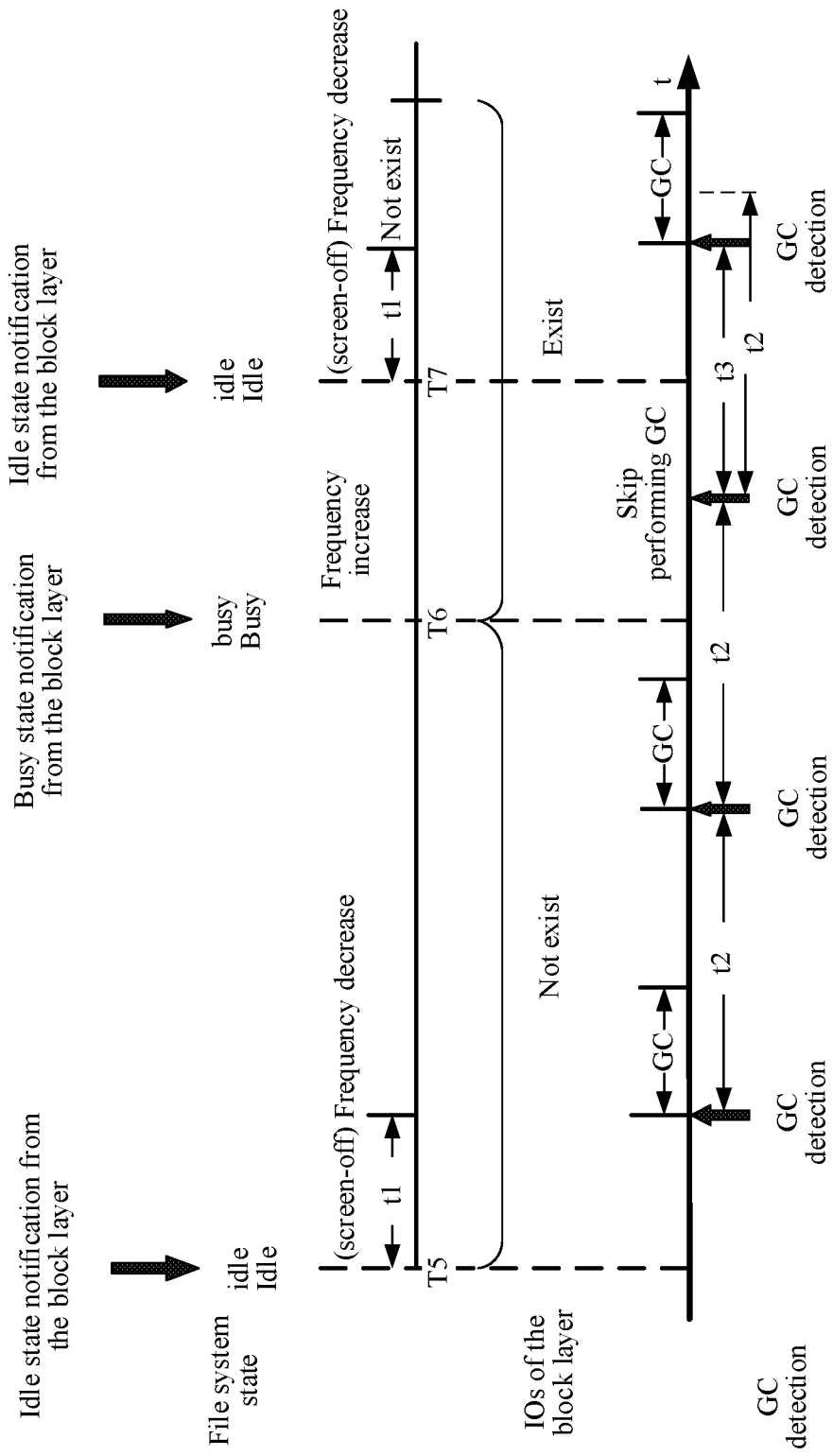
FIG. 8 is a schematic diagram of another GC detection process according to an embodiment of this application.

In order to further describe the GC processing process in the embodiments of this application, further description is provided based on the descriptions of FIG. 6A, FIG. 6B, and FIG. 7. FIG. 8 is a schematic diagram of another GC detection process according to an embodiment of this application. As shown in FIG. 8, at a time point T5, when the file system of the electronic device acquires an idle state (idle) notification of the block layer, timing may be started. After a first duration (t1), GC detection is triggered. Because the idle state is met and the block layer has no IO occupation, GC processing is performed, and the internal memory and the processor perform frequency decreasing. In addition, when the GC detection is triggered, the timing of the GC detection cycle is started, and when the timing reaches a second duration (t2), the GC detection may be started. In this case, a GC processing condition is met, and the GC process is performed. At a time point T6, the file system receives a notification from the Block layer that the file state is busy, and the electronic device may increase the frequencies of the internal memory and the processor. After the t2 duration following the last GC detection, the GC detection is performed again. Because there are IOs occupied, skip performing GC. At the time point T6, when the file system of the electronic device acquires an idle state (idle) notification of the block layer again, timing may be started. After a first duration (t1), GC detection is triggered. Because the idle state is met and the block layer has no IO occupation, GC processing is performed, and the internal memory and the processor perform frequency decreasing. After the time point T5 and the time point T7, the processing processes are basically consistent. The time interval between the GC detection after t1 following the time point T7 and the last GC detection is t3, and t3 is shorter than t2. The specific process may be understood with reference to FIG. 6A, FIG. 6B, and FIG. 7, and details are not described herein.

In the foregoing process, because the process of triggering the GC breaks the original periodic triggering process, the trigger condition is that no IO port of the Block layer is occupied, and there is a high probability that the user is not using electronic device at this time, that is, the IO ports of the Block layer are all idle, and the file system is usually also in the idle state. By triggering the GC detection in this case, the probability of successfully performing the GC detection increases, which can reduce the quantity of times of GC window missing due to the conflict caused by that both the GC detection and user operations occupy the IO ports of the Block layer, and improving the success rate of execution of the GC processing. The probability of determining execution of GC processing through GC detection increases, and the quantity of times for which storage devices such as disks of the electronic device are organized increases, thereby delaying freezing of the electronic device and prolonging the service life of the electronic device.

In the embodiments of this application, the electronic device may include a hardware layer, an operating system layer running on the hardware layer, and an application layer running on the operating system layer. The hardware layer includes hardware such as a central processing unit (central processing unit, CPU), a memory management unit (memory management unit, MMU), and an internal memory (also referred to as a main memory). The operating system may be any one or more computer operating systems that implement service processing through a process (process), for example, a Linux operating system, a Unix operating system, an Android operating system, an IOS operating system, or a windows operating system. The application layer includes applications such as a browser, an address book, word processing software, and instant messaging software.

Figure 9:
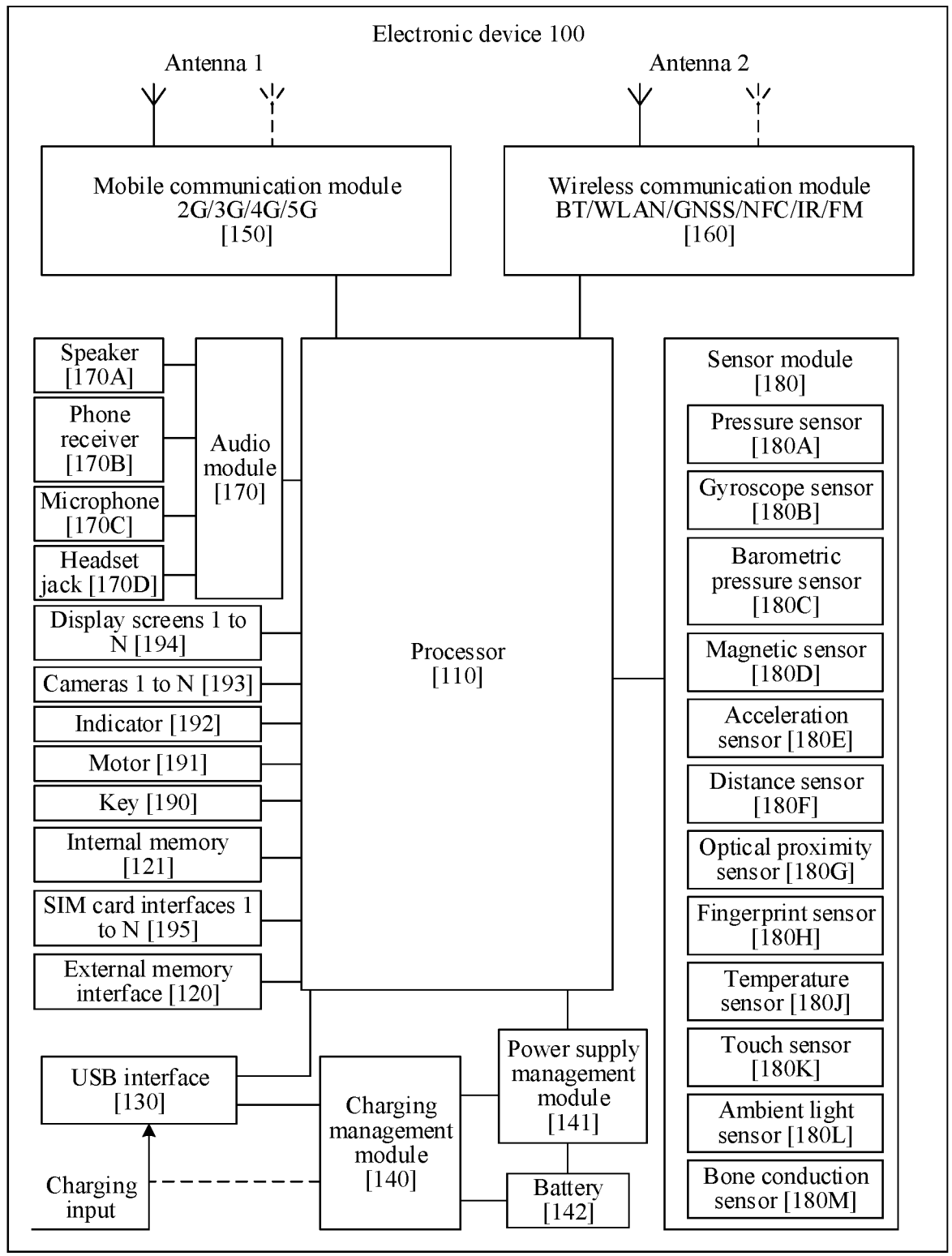
FIG. 9 is a schematic diagram of a hardware structure of an electronic device 100 according to an embodiment of this application.

To help better understand the embodiments of this application, the following describes a structure of an electronic device in the embodiments of this application:

FIG. 9 is a schematic diagram of a hardware structure of an electronic device 100. The electronic device 100 may include a processor 110, an external memory interface 120, an internal memory 121, a universal serial bus (universal serial bus, USB) interface 130, a charging management module 140, a power supply management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the schematic structure in this embodiment of this application constitutes no specific limitation on the electronic device 100. In some other embodiments of this application, the electronic device 100 may include more or fewer components than those shown in the figure, or some components may be combined, or some components may be split, or a different component arrangement may be used. The components in the portrait may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separate devices, or may be integrated into one or more processors.

The controller may generate an operation control signal according to instruction operation code and a time-sequence signal, and control obtaining and executing of instructions.

The processor 110 may be further provided with a memory, configured to store instructions and data. In some embodiments, the memory in the processor 110 is a cache memory. The memory may store instructions or data that have just been used or recycled by the processor 110. If the processor 110 needs to use the instructions or the data again, the processor 110 may call the instructions or the data from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules illustrated in the embodiments of this application is an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from the charger. The charger may be a wireless charger, or may be a wired charger. In some embodiments of wired charging, the charging management module 140 may receive a charging input of a wired charger by using the USB interface 130. In some embodiments of wireless charging, the charging management module 140 may receive wireless charging input by using a wireless charging coil of the electronic device 100. The charging management module 140 may supply power for the electronic device by using the power supply management module 141 while charging the battery 142.

The power supply management module 141 is configured to be connected to the battery 142, the charging management module 140, and the processor 110. The power supply management module 141 receives an input from the battery 142 and/or the charging management module 140 and supplies power to the processor 110, the internal memory 121, the display screen 194, the camera 193, the wireless communication module 160, and the like. The power supply management module 141 may be further configured to monitor parameters such as a battery capacity, a quantity of battery cycles, and a battery health status (for example, leakage or impedance). In some other embodiments, the power supply management module 141 may alternatively be arranged in the processor 110. In some other embodiments, the power supply management module 141 and the charging management module 140 may alternatively be arranged in a same device.

The wireless communication function of the electronic device 100 can be implemented by using the antenna 1, the antenna 2, the mobile communication module 150, the wireless communication module 160, the modem processor, the baseband processor, and the like.

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render an image. The processor 110 may include one or more GPUs that execute a program instruction to generate or change display information.

The display screen 194 is configured to display an image, a video, and the like. The display screen 194 includes a display panel. The display panel may use a liquid crystal display screen (liquid crystal display, LCD), an organic light-emitting diode (organic light-emitting diode, OLED), a passive matrix/organic light emitting diode or an active matrix/organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device 100 may include 1 or N display screens 194. N is a positive integer greater than 1.

The electronic device 100 may implement a photographing function by using the ISP, the camera 193, the video codec, the GPU, the display screen 194, the application processor, and the like.

The electronic device 100 may implement an audio function, for example, music playing and recording, by using the audio module 170, the speaker 170A, the phone receiver 170B, the microphone 170C, the headset jack 170D, the application processor, and the like. The audio function is, for example, music playback and sound recording.

The audio module 170 is configured to convert digital audio information into analog audio signal output, and is also configured to convert analog audio input into a digital audio signal. The audio module 170 may further be configured to encode and decode audio signals. In some embodiments, the audio module 170 may be disposed in the processor 110, or some functional modules in the audio module 170 are disposed in the processor 110.

The SIM card interface 195 is configured to connect to a SIM card. The SIM card may be inserted into the SIM card interface 195 or plugged from the SIM card interface 195, to come into contact with or be separated from the electronic device 100. The electronic device 100 may support one or N SIM card interfaces. N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may also be compatible with an external storage card. The electronic device 100 interacts with a network by using a SIM card, to implement functions such as a call and data communication. In some embodiments, the electronic device 100 uses an eSIM, that is, an embedded SIM card. The eSIM card may be embedded in the electronic device 100 and cannot be separated from the electronic device 100.

In the embodiments of this application, the display state of the display screen may include a screen-on state and a screen-off state, and the Block layer or the file system of the electronic device in FIG. 4 may acquire the state of the display screen. Specifically, the electronic device may include a display driver, and the display driver may determine the current display state of the display screen, and the Block layer or the file system may acquire the display state from the display driver.

All or some of the foregoing embodiments may be implemented by using software, hardware, firmware, or any combination thereof. When the software is used for implementation, all or some of the embodiments may be implemented in a form of a computer program product. The computer program product includes one or more computer indications. When the computer program indications are loaded and executed on a computer, all or some of the procedures or functions according to the embodiments of this application are generated. The computer may be a general-purpose computer, a dedicated computer, a computer network, or other programmable apparatuses. The computer indications may be stored in a computer-readable storage medium or transmitted from one computer-readable storage medium to another computer-readable storage medium. For example, the computer indications may be transmitted from one website, computer, server, or data center to another website, computer, server, or data center in a wired (for example, a coaxial cable, an optical fiber, or a digital subscriber line) manner or a wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, an SSD), or the like.

A person of ordinary skill in the art may understand that all or some of the procedures of the methods in the embodiments are implemented. The procedures may be completed by a computer program instructing related hardware. The program may be stored in a computer-readable storage medium. When the program is executed, the procedures in the foregoing method embodiments may be included. The foregoing storage medium includes: any medium that can store program code, such as a ROM, a random access memory RAM, a magnetic disk, or an optical disc.

What is claimed is:

1. A storage space organization method, wherein the method is applied to an electronic device, a kernel of the electronic device comprises a file system and a block layer, and the method comprises:
monitoring, by the electronic device, input/output ports (IOs) through the block layer, and determining, by the block layer when there is IO release, whether all the IOs have been released, wherein when all the IOs have been released, the electronic device updates a state of the file system to an idle state through the block layer, to trigger the electronic device to perform first garbage collection processing through the file system, and the state of the file system comprises the idle state or a busy state;
when a second duration has elapsed since a last garbage collection detection, triggering, by the electronic device through the file system, garbage collection detection and determining whether a garbage collection condition is met; and performing, by the electronic device when the garbage collection condition is met, the first garbage collection processing through the file system, wherein the garbage collection condition is that the state of the file system is the idle state and all the IOs of the block layer have been released; and
updating, by the electronic device, the state of the file system to the idle state through the block layer, and triggering, by the file system after a first duration, garbage collection detection and determining whether the garbage collection condition is met; and performing, by the electronic device when the garbage collection condition is met, the first garbage collection processing through the file system, wherein
a duration between the file system triggering the garbage collection detection after the first duration and the last garbage collection detection is less than the second duration.

2. The method according to claim 1, wherein the electronic device further comprises a storage device, and after the updating, by the electronic device, the state of the file system to the idle state through the block layer, the method further comprises:
triggering, by the electronic device through the block layer, the storage device to perform second garbage collection processing.

3. The method according to claim 1, wherein the monitoring, by the electronic device, IOs through the block layer comprises:
monitoring, by the electronic device through the block layer, whether a task instruction is received, wherein the task instruction is a notification sent to the block layer when the file system acquires a first task and indicating execution of the first task;
determining, by the electronic device when the block layer receives the task instruction, that there is IO occupation through the block layer;
monitoring, by the electronic device through the block layer, whether a task end notification is received, wherein the task end notification is a notification sent to the block layer when a storage device of the electronic device completes execution of the first task; and
determining, by the electronic device when the block layer receives the task end notification, that there is IO release through the block layer.

4. The method according to claim 3, wherein the electronic device further comprises an internal memory and a processor, and when the block layer receives the task instruction, the method further comprises:
controlling, by the electronic device through the block layer, the internal memory to increase a first operating frequency; and
controlling, by the electronic device through the block layer, the processor to increase a second operating frequency.

5. The method according to claim 3, wherein the electronic device further comprises an internal memory and a processor, and when the block layer receives the task end notification, and the electronic device is in a preset state, the method further comprises:
controlling, by the electronic device through the block layer, the internal memory to decrease a first operating frequency; and
controlling, by the electronic device through the block layer, the processor to decrease a second operating frequency.

6. The method according to claim 5, wherein the preset state is that the electronic device is in a screen-off state and the state of the file system is updated to the idle state.

7. An electronic device, comprising: one or more processors and one or more memories, wherein the one or more processors are coupled to the one or more memories, the one or more memories are configured to store computer program code, the computer program code comprises computer instructions, and when the one or more processors execute the computer instructions, the electronic device is enabled to perform:
monitoring, by the electronic device, input/output ports (IOs) through a block layer of the electronic device, and determining, by the block layer when there is IO release, whether all the IOs have been released, wherein when all the IOs have been released, the electronic device updates a state of a file system of the electronic device to an idle state through the block layer, to trigger the electronic device to perform first garbage collection processing through the file system, and the state of the file system comprises the idle state and a busy state;
when a second duration has elapsed since the last garbage collection detection, triggering, by the electronic device through the file system, garbage collection detection and determining whether a garbage collection condition is met; and performing, by the electronic device when the garbage collection condition is met, the first garbage collection processing through the file system, wherein the garbage collection condition is that the state of the file system is the idle state and all the IOs of the block layer have been released; and
updating, by the electronic device, the state of the file system to the idle state through the block layer, and triggering, by the file system after a first duration, garbage collection detection and determining whether the garbage collection condition is met; and performing, by the electronic device when the garbage collection condition is met, the first garbage collection processing through the file system, wherein
a duration between the file system triggering the garbage collection detection after the first duration and the last garbage collection detection is less than the second duration.

8. The electronic device according to claim 7, wherein the electronic device further comprises a storage device, and when the one or more processors execute the computer instructions, the electronic device is enabled to perform:
  after the updating, by the electronic device, the state of the file system to the idle state through the block layer, triggering, by the electronic device through the block layer, the storage device to perform second garbage collection processing.

9. The electronic device according to claim 7, wherein the monitoring, by the electronic device, IOs through the block layer comprises:
  monitoring, by the electronic device through the block layer, whether a task instruction is received, wherein the task instruction is a notification sent to the block layer when the file system acquires a first task and indicating execution of the first task;
  determining, by the electronic device when the block layer receives the task instruction, that there is IO occupation through the block layer;
  monitoring, by the electronic device through the block layer, whether a task end notification is received, wherein the task end notification is a notification sent to the block layer when a storage device of the electronic device completes execution of the first task; and
  determining, by the electronic device when the block layer receives the task end notification, that there is IO release through the block layer.

10. The electronic device according to claim 9, wherein the electronic device further comprises an internal memory, and when the one or more processors execute the computer instructions, the electronic device is enabled to perform:
  when the block layer receives the task instruction, controlling, by the electronic device through the block layer, the internal memory to increase a first operating frequency; and
  controlling, by the electronic device through the block layer, the processor to increase a second operating frequency.

11. The electronic device according to claim 9, wherein the electronic device further comprises an internal memory, and when the one or more processors execute the computer instructions, the electronic device is enabled to perform:
  when the block layer receives the task end notification, and the electronic device is in a preset state, controlling, by the electronic device through the block layer, the internal memory to decrease a first operating frequency; and
  controlling, by the electronic device through the block layer, the processor to decrease a second operating frequency.

12. The electronic device according to claim 11, wherein the preset state is that the electronic device is in a screen-off state and the state of the file system is updated to the idle state.

13. A non-transitory computer-readable storage medium, comprising instructions, wherein when the instructions are run on an electronic device, the electronic device is enabled to perform:
  monitoring input/output ports (IOs) through a block layer of the electronic device, and determining, by the block layer when there is IO release, whether all the IOs have been released, wherein when all the IOs have been released, the electronic device updates a state of a file system to an idle state through the block layer, to trigger the electronic device to perform first garbage collection processing through the file system, and the state of the file system comprises the idle state and a busy state;
  when a second duration has elapsed since the last garbage collection detection, triggering, by the electronic device through the file system, garbage collection detection and determining whether a garbage collection condition is met; and performing, by the electronic device when the garbage collection condition is met, the first garbage collection processing through the file system, wherein the garbage collection condition is that the state of the file system is the idle state and all the IOs of the block layer have been released; and
  updating, by the electronic device, the state of the file system to the idle state through the block layer, and triggering, by the file system after a first duration, garbage collection detection and determining whether the garbage collection condition is met; and performing, by the electronic device when the garbage collection condition is met, the first garbage collection processing through the file system, wherein
  a duration between the file system triggering the garbage collection detection after the first duration and the last garbage collection detection is less than the second duration.

* * * * *